Feb. 16, 1943.  J. B. SHOPE  2,311,353
CULTIVATOR
Filed Dec. 3, 1940  3 Sheets-Sheet 2
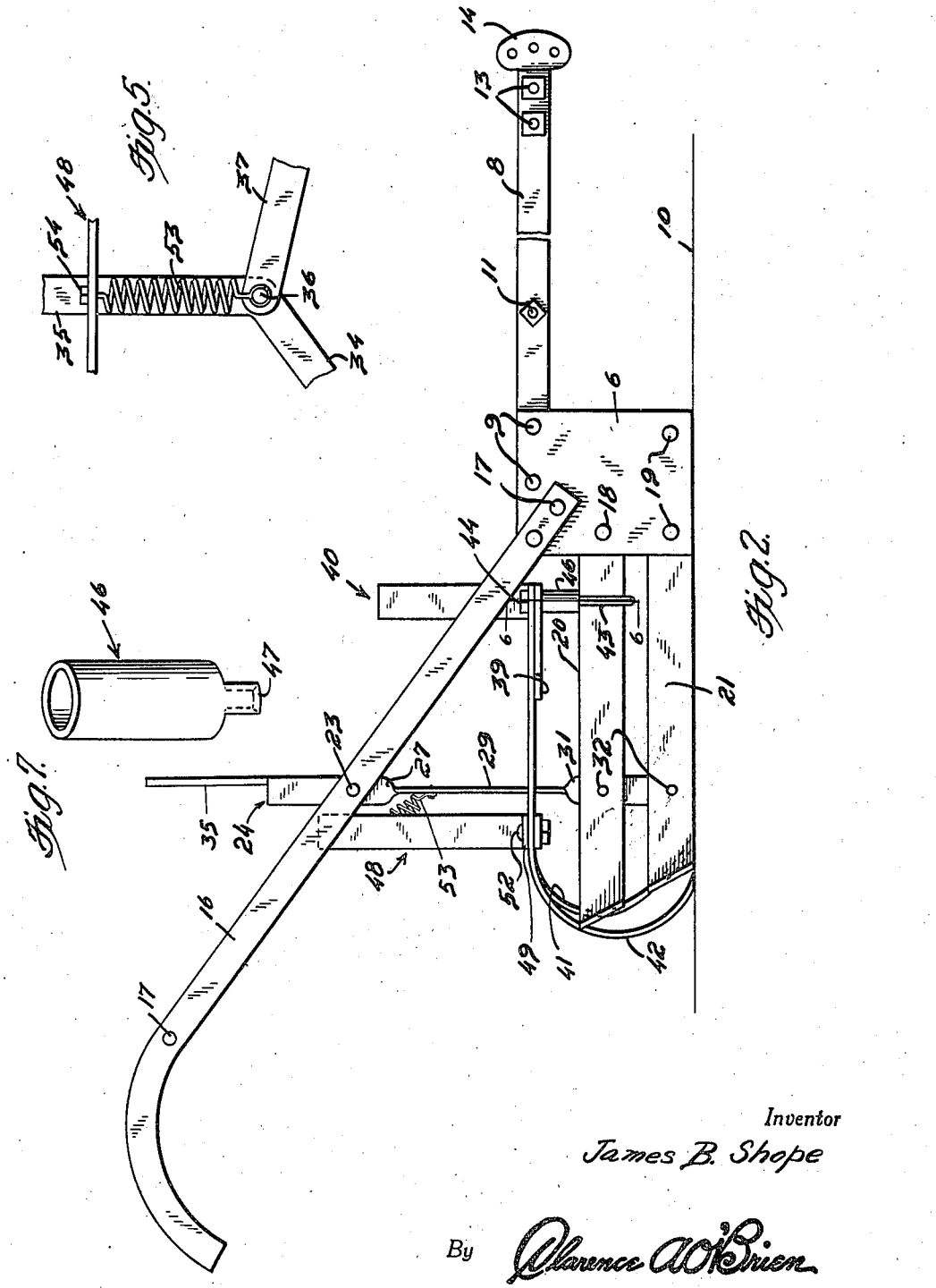
Inventor
James B. Shope
By Clarence A. O'Brien
Attorney Feb. 16, 1943.  J. B. SHOPE  2,311,353
CULTIVATOR
Filed Dec. 3, 1940    3 Sheets-Sheet 3
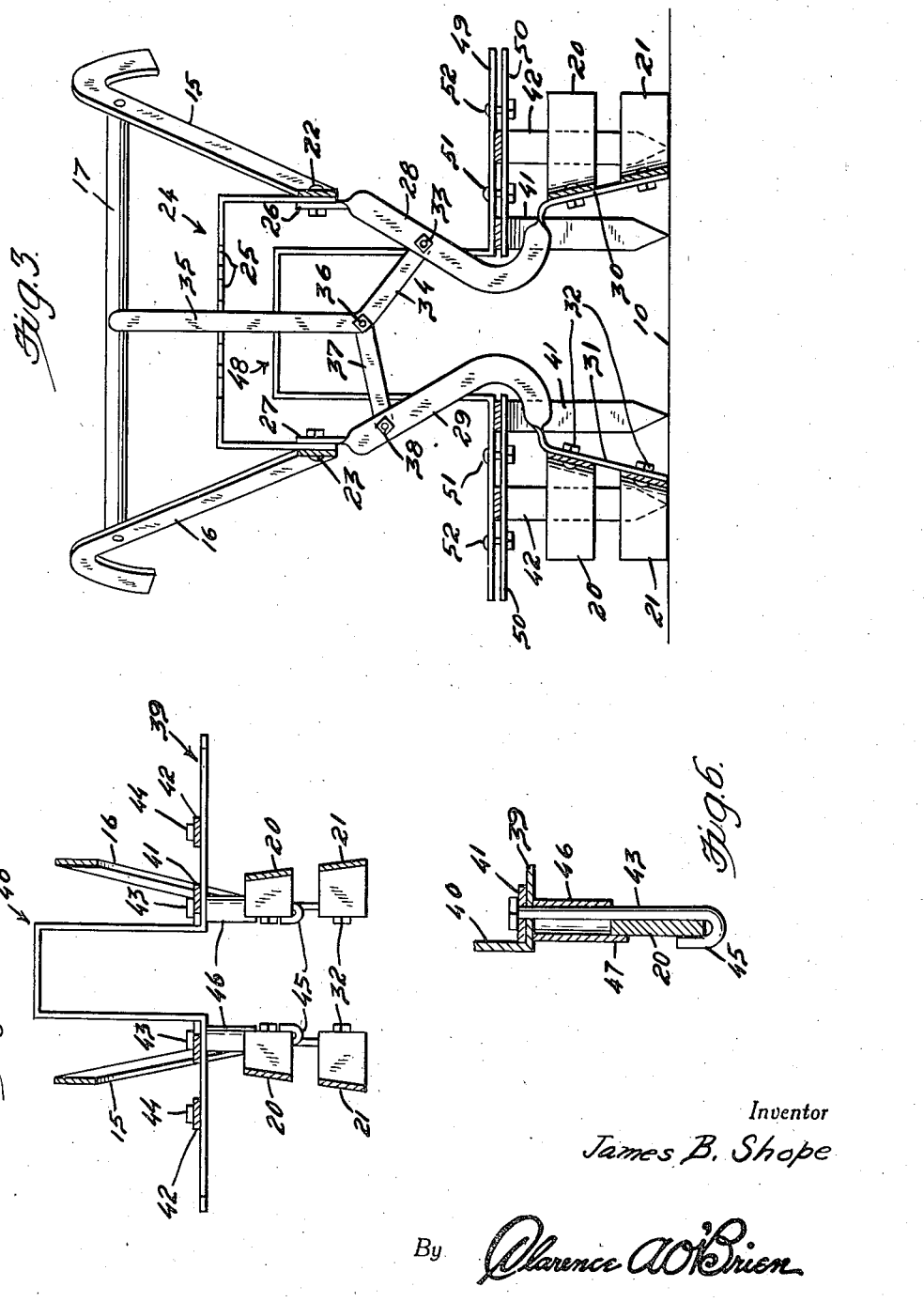
Inventor
James B. Shope
By Clarence A. O'Brien
Attorney Patented Feb. 16, 1943

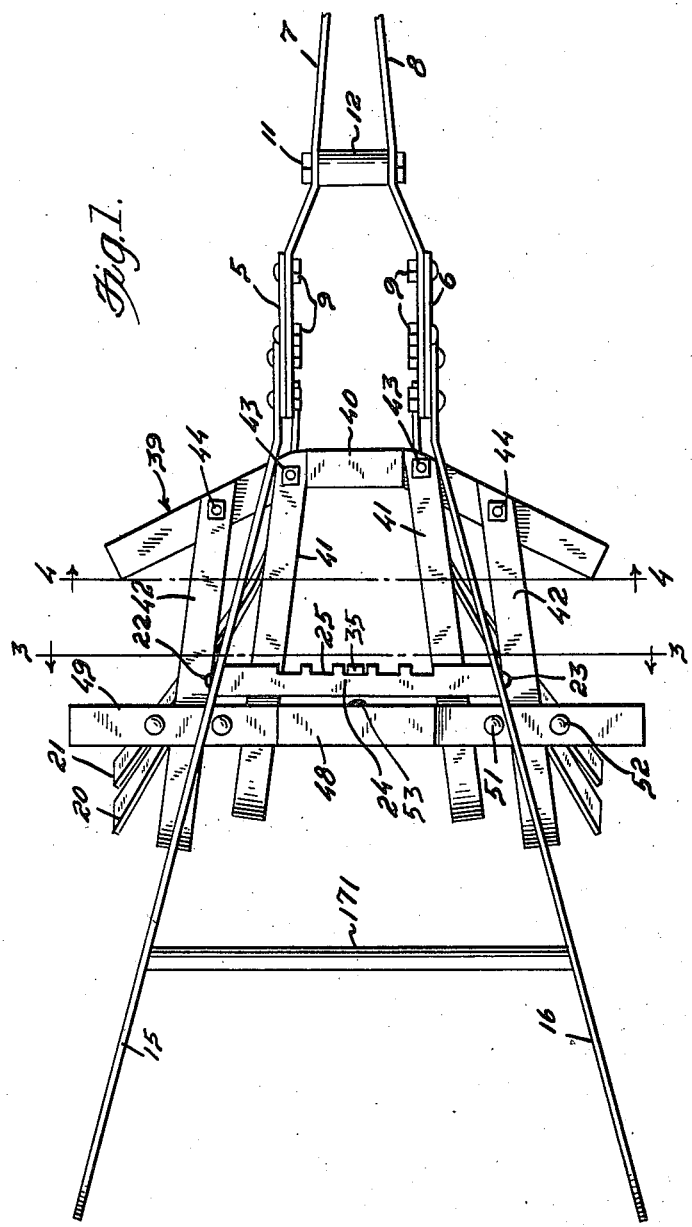

2,311,353

UNITED STATES PATENT OFFICE 2,311,353

CULTIVATOR

James B. Shope, Ranger, Ga.

Application December 3, 1940, Serial No. 368,405

3 Claims. (Cl. 97—167)

My invention relates to improvements in cultivators, and the primary object of the invention is to augment a conventional cultivator arrangement, of the Fowler type, for instance, so as to convert the same for additional and multiple uses.

Other important objects and advantages of my invention will be apparent from a reading of the following description taken in connection with the appended drawings, wherein for purposes of illustration I have shown a preferred embodiment of my invention.

In the drawings:

Figure 1 is a general top plan view of the embodiment.

Figure 2 is a general right hand side elevational view thereof.

Figure 3 is a transverse vertical sectional view taken through Figure 1 along the line 3—3 and looking toward the left in the direction of the arrow.

Figure 4 is a transverse vertical sectional view taken through Figure 1 along the line 4—4 and looking in the direction of the arrow.

Figure 5 is a fragmentary elevational view of the retracting spring arrangement.

Figure 6 is a transverse vertical sectional view taken through Figure 2 along the line 6—6.

Figure 7 is a perspective view of one of the tubular assembling elements.

Referring in detail to the drawings, the numerals 5 and 6 designate similar rectangular side plates which are vertically and parallelly disposed and have the draft bars 7 and 8, respectively, bolted at 9 to the inner sides of the corresponding plates adjacent the upper edges thereof to extend forwardly from the plates in spaced relation to the ground 10. Forwardly of the plates 5 and 6 the bars 7 and 8 are converged and are secured together in spaced relation by a bolt 11 passing through a tubular spacer 12, the front ends of the bars 7 and 8 being bolted at 13 to a draft fixture 14. Rearwardly inclining divergent handle bars 15 and 16 are bolted at 17 to the outer sides of the plates 5 and 6, so that the handle bars extend rigidly relative to the plates 5 and 6. Intermediate portions of the handle bars are spaced and connected by a suitable element designated 17'.

Bolted at 18 and 19 to the inner sides of the respective plates 5 and 6 are the vertically spaced horizontal laterally outwardly curving spring fingers 20 and 21, the upper fingers 20 extending farther rearwardly than the lower fingers 21.

Pivot bolts 22 and 23 traverse the corresponding handle bars 15 and 16 at a point just forward of the rearward terminals of the spring fingers, and mounted between the handle bars and on the pivots are the legs of an inverted U-shaped bar 24 which has longitudinally spaced notches 25 in its front edge. Also traversed by the bolts 22 and 23 are ears 26 and 27 on the upper ends of laterally inwardly and outwardly angulated J-shaped bars 28 and 29 which terminate at their lower ends in laterally outwardly declining portions 30 and 31 which are bolted as indicated at 32 to the inner sides of intermediate portions of the upper and lower spring fingers 20 and 21.

A pivot bolt 33 traverses an intermediate portion of the J-shaped bar 28 to pivotally connect thereto the lower end of a laterally outwardly declining portion 34 on the vertical operating lever 35 which operates across the front edge of the U-shaped bar 24 and is adapted to seat in a selected one of the notches 25. The junction of the main portion of the lever 35 with the portion 34 is traversed by a pivot bolt 36 which pivotally connects the laterally inward end of a link 37 to this point of the lever 35. The opposite or outer end of the link 37 is pivotally connected as indicated by the numeral 38 adjacent the upper end of the J-shaped bar 29. Due to the rigid relation of the main portion of the lever 35 with its portion 34, lateral deflection of the upper part of the lever to either side will produce a corresponding approach or separation of the J-shaped bars 28 and 29, with corresponding warping of the upper and lower spring fingers 20 and 21 to either spread or contract them in accordance with the width of the row. The lever 35 is to be engaged in the notch 25 corresponding to the desired position to retain the adjustment. The foregoing construction and arrangement of parts is characteristic of cultivators of the Fowler type, and there are no claims made by me of the same as my invention, and uncombined with the following described structure and arrangement of parts. This type of cultivator is adapted to straddle a row of plants and the plates 6 will cut into the soil on both sides of the row of plants and the spring fingers 20 and 21 will move the dirt, with any clogs and rocks therein away from the row and toward the center of the space between rows. Fine dirt will drop back adjacent the row of plants through the spaces between the upper and lower fingers 20 and 21. It has been found that this type of cultivator will leave the soil adjacent the row of plants flat and hard so it is the object of my invention to provide teeth for cultivating this flat and hard part of the ground on each side of the row of plants.

In accordance with the present invention the said type of cultivator is modified by the provision of a frame characterized by a front horizontal member 39 whose end portions are rearwardly and laterally outwardly deflected as apparent in Figure 1 of the drawings, the said element being characterized by a U-shaped upset 40 intermediate its ends. Inner and outer spring teeth 41 and 42, respectively, have their recumbent substantially horizontal portions connected at their forward ends on top of the element 39, the inner teeth having their connections 43 close to the sides of the upset 40, with the outer teeth having their connections 44 laterally outwardly spaced from the connections 43. The bolts forming the connections 43 traverse the element 39 and pass down along the outer sides of the upper spring fingers 20 and have hooks 45 on their lower ends which embrace the lower edges of the said spring fingers in the manner illustrated in Figure 6, with a tubular spacer 46 keeping the element 39 and the upper edge of the spring finger 20 separated at a required interval. The tubular spacer through which the bolt 43 passes is characterized by a finger 47 on its lower end which lies along the same side of the spring finger 20 as the terminal of the hook portion 45 as shown in Figure 6. In this way the spring teeth are securely mounted on the cultivator and extend in parallel pairs in a rearward direction with the downwardly and forwardly curved terminals of the spring teeth located adjacent the laterally outwardly deflected terminals of the spring fingers 20 and 21, as clearly shown in Figures 1 and 3. Rising from the rearward end of the horizontal portions of the spring teeth 41 and 42 is a U-shaped member 48 the lower ends of whose legs have laterally outwardly projecting extensions 49 which rest directly on the upper sides of the spring teeth. Assembling bars 50 arranged coextensively with the portions 49 of the member 48 engage the underside of the spring teeth as illustrated in Figure 3, and clamping bolts 51 and 52 traverse the elements 49 and 50 to firmly assemble the parts involved and preserve the selected relative positions of the spring teeth.

A contractile spring 53 has its upper end anchored at an intermediate point 54 of the bight portion of the U-shaped bar 48 and has its lower end connected with the pivot bolt 36 which connects the lever 35 and the link 37, the spring acting to move the member 48 and the rear portions of the spring teeth 41 and 42 downwardly to cause the teeth to dig into the ground and thus form furrows in the flat parts of the ground formed by the lower spring teeth 21 of the cultivator.

Although I have shown and described herein a preferred embodiment of my invention, it is to be definitely understood that I do not wish to limit the application of the invention thereto, except as may be required by the scope of the subjoined claims.

Having described the invention, what is claimed as new is:

1. A cultivator comprising a pair of laterally spaced vertical plates, draft bars connected to extend forwardly from said plates, laterally outwardly and rearwardly angulated horizontal spring fingers connected to project rearwardly from said plates, upwardly and rearwardly inclined handle bars projecting from said plates, a detent bar connected between intermediate portions of said handle bars, depending bars connected at their lower ends to said spring fingers and at their upper ends to said intermediate portions of the handle bars, a vertical laterally swingable hand lever having a laterally deflected lower portion, the terminal of said lower portion being pivoted to one of said depending bars, a link pivoted at one end to the remaining depending bar and pivoted at its opposite end to a lower part of said hand lever, said hand lever being swingable on the last-mentioned pivotal point to cause lateral approach or separation of said depending bars and corresponding deflection of said spring fingers, a first frame anchored on a forward part of said spring fingers, rearwardly extending spring teeth secured at their front ends to said frame, a second frame secured to rear portions of said spring teeth, said second frame including a riser located behind said detent bar a height above the pivotal point of said hand lever, and a contractile spring stretched between said pivotal point and said riser.

2. A cultivator comprising a pair of laterally spaced vertical plates, draft bars connected to extend forwardly from said plates, laterally outwardly and rearwardly angulated horizontal spring fingers connected to project rearwardly from said plates, upwardly and rearwardly inclined handle bars projecting from said plates, a detent bar connected between intermediate portions of said handle bars, depending bars connected at their lower ends to said spring fingers and at their upper ends to said intermediate portions of the handle bars, a vertical laterally swingable hand lever having a laterally deflected lower portion, the terminal of said lower portion being pivoted to one of said depending bars, a link pivoted at one end to the remaining depending bar and pivoted at its opposite end to a lower part of said hand lever, said hand lever being swingable on the last-mentioned pivotal point to cause lateral approach or separation of said depending bars and corresponding deflection of said spring fingers, a first frame anchored on a forward part of said spring fingers, rearwardly extending spring teeth secured at their front ends to said frame, a second frame secured to rear portions of said spring teeth, said second frame including a riser located behind said detent bar a height above the pivotal point of said hand lever, and a contractile spring stretched between said pivotal point and said riser, said spring fingers comprising upper and lower vertically spaced pairs.

3. A cultivator comprising a pair of laterally spaced vertical plates, draft bars connected to extend forwardly from said plates, laterally outwardly and rearwardly angulated horizontal spring fingers connected to project rearwardly from said plates, upwardly and rearwardly inclined handle bars projecting from said plates, a detent bar connected between intermediate portions of said handle bars, depending bars connected at their lower ends to said spring fingers and at their upper ends to said intermediate portions of the handle bars, a vertical laterally swingable hand lever having a laterally deflected lower portion, the terminal of said lower portion being pivoted to one of said depending bars, a link pivoted at one end to the remaining depending bar and pivoted at its opposite end to a lower part of said hand lever, said hand lever being swingable on the last-mentioned pivotal point to cause lateral approach or separation of said depending bars and corresponding deflection of said spring fingers, a first frame anchored on a forward part of said spring fingers, rearwardly extending spring teeth secured at their front ends to said frame, a second frame secured to rear portions of said spring teeth, said second frame including a riser located behind said detent bar a height above the pivotal point of said hand lever, and a contractile spring stretched between said pivotal point and said riser, said spring fingers comprising upper and lower vertically spaced pairs, said spring teeth having downwardly curved terminals located laterally inwardly with respect to the terminals of said spring fingers.

JAMES B. SHOPE.